United States Patent
Lu et al.

(10) Patent No.: US 12,399,477 B2
(45) Date of Patent: Aug. 26, 2025

(54) METHODS AND APPARATUSES FOR DATA ACQUISITION, STORAGE MEDIUMS AND ELECTRONIC DEVICES

(71) Applicant: ZHEJIANG LAB, Hangzhou (CN)

(72) Inventors: Hongfei Lu, Hangzhou (CN); Shaoyong Li, Hangzhou (CN); Wenjiao Yang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/006,367

(22) PCT Filed: Dec. 5, 2022

(86) PCT No.: PCT/CN2022/136607
§ 371 (c)(1),
(2) Date: Jan. 20, 2023

(87) PCT Pub. No.: WO2024/092949
PCT Pub. Date: May 10, 2024

(65) Prior Publication Data
US 2024/0248447 A1 Jul. 25, 2024

(30) Foreign Application Priority Data
Nov. 3, 2022 (CN) .......................... 202211366706.0

(51) Int. Cl.
*G05B 19/042* (2006.01)
(52) U.S. Cl.
CPC .................. *G05B 19/0425* (2013.01); *G05B 2219/25249* (2013.01)
(58) Field of Classification Search
CPC .................. G05B 19/0425; G05B 2219/25249
See application file for complete search history.

(56) References Cited

U.S. PATENT DOCUMENTS 6,611,724 B1  8/2003 Buda et al.
6,937,949 B1  8/2005 Fishman et al.
(Continued)

FOREIGN PATENT DOCUMENTS

CN    102750819 A    10/2012
CN    105302383 A     2/2016
(Continued)

OTHER PUBLICATIONS

Nam, H. et al., "Jitter-Robust Video Retargeting With Kalman Filter and Attention Saliency Fusion Network," Proceedings of the 2020 IEEE International Conference on Image Processing (ICIP), Oct. 25, 2020, Abu Dhabi, United Arab Emirates, 5 pages.
(Continued)

*Primary Examiner* — Vincent H Tran
(74) *Attorney, Agent, or Firm* — McCoy Russell LLP (57) ABSTRACT

The present disclosure discloses a method, a device, a storage medium and a electronic device for data acquisition. The method for data acquisition comprises: determining an initial state for the target port and performing state monitoring; if the initial state is monitored to change, taking the changed state as the target state; upon monitoring the change of the initial state, after a first monitoring period, determining the completion of the jitters-eliminating for the signal received by the target port; and during a second monitoring period, determining whether a state for the target port monitored each time is the target state; if yes, taking the target state as a state for the target port and storing the target state; and performing data acquisition according to the stored state corresponding to the target port.

11 Claims, 3 Drawing Sheets

(56) References Cited

U.S. PATENT DOCUMENTS

| | | | |
|---|---|---|---|
| 11,750,184 B1 * | 9/2023 | Quan | H03K 5/1252 327/34 |
| 2007/0244571 A1 | 10/2007 | Wilson et al. | |
| 2014/0188395 A1 | 7/2014 | Poole et al. | |
| 2017/0048133 A1 * | 2/2017 | Walker | H04L 43/087 |
| 2018/0128701 A1 * | 5/2018 | Lee | G01M 5/005 |
| 2019/0227610 A1 * | 7/2019 | Li | G06F 13/40 |
| 2019/0340144 A1 * | 11/2019 | Li | G06F 13/4072 |
| 2022/0360201 A1 * | 11/2022 | Arita | H02P 6/00 |

FOREIGN PATENT DOCUMENTS

| | | |
|---|---|---|
| CN | 109596907 A | 4/2019 |
| CN | 110047260 A | 7/2019 |
| CN | 110049237 A | 7/2019 |
| CN | 112134544 A | 12/2020 |
| CN | 113422429 A | 9/2021 |
| CN | 114822802 A | 7/2022 |
| CN | 114866375 A | 8/2022 |
| CN | 115185755 A | 10/2022 |
| CN | 115422015 A | 12/2022 |

OTHER PUBLICATIONS

Wenjiao, Y. et al., "A Method for Arbitration and Scheduling of Mimicry Industrial Controllers," Journal of Information Security Research, vol. 8, No. 6, Jun. 17, 2022, 11 pages.

State Intellectual Property Office of the People's Republic of China, Office Action and Search Report Issued in Application No. 202211366706.0, Dec. 20, 2022, 7 pages. (Submitted with Machine/Partial Translation).

ISA State Intellectual Property Office of the People's Republic of China, International Search Report Issued in Application No. PCT/CN2022/136607, Feb. 21, 2023, WIPO, 7 pages.

ISA State Intellectual Property Office of the People's Republic of China, Written Opinion of the International Searching Authority Issued in Application No. PCT/CN2022/136607, Feb. 21, 2023, WIPO, 8 pages.

* cited by examiner

METHODS AND APPARATUSES FOR DATA ACQUISITION, STORAGE MEDIUMS AND ELECTRONIC DEVICES

CROSS REFERENCE TO RELATED APPLICATIONS

This application is a US National Phase of a PCT Application No. PCT/CN2022/136607 filed on Dec. 5, 2022, which claims priority to Chinese Patent Application No. 2022113667060 filed on Nov. 3, 2022, the entire contents of which are incorporated herein by reference in their entireties.

TECHNICAL FIELD

The present disclosure relates to a technical field of computers, and in particular to methods and apparatuses for data acquisition, storage mediums and electronic devices.

BACKGROUND

In industrial control scenarios, control systems need to acquire data such as voltage, current, etc. through a digital input/output (I/O) module, and in a process of data acquisition by the digital I/O module, random interference and noise are usually generated due to the acquisition environment and device configuration, etc. These random interference and noise can cause errors in the acquired data. Therefore, in order to eliminate or alleviate the errors and improve accuracy of the acquired data, the acquired data needs to be filtered.

However, the filtering efficiency of the filtering methods used in related arts is low, which seriously affects the speed of data acquisition and thus leads to a slower response of the control system.

Therefore, in the process of data acquisition, how to improve the efficiency of data filtering, improve the efficiency of data acquisition, and further accelerate the response speed of the control system is an urgent problem to be solved.

SUMMARY

The present disclosure provides methods, devices, storage mediums and electronic devices for data acquisition.

In a first aspect, the present disclosure provides a method for data acquisition including: determining an initial state for a target port; performing state monitoring for the target port; in response to monitoring that the initial state changes, taking the changed state as a target state; upon monitoring that the initial state changes, after a first monitoring period, determining that a jitters-eliminating processing for a signal received by the target port is completed; during a second monitoring period after determining the completion of the jitters-eliminating processing, determining whether a state for the target port monitored at each state monitoring is the target state; in response to determining that, during the second monitoring period after determining the completion of the jitters-eliminating processing, the state for the target port monitored at each state monitoring is the target state, taking the target state as a state for the target port and storing the target state; and performing data acquisition according to the stored state corresponding to the target port.

In some embodiments, performing state monitoring of the target port includes: performing state monitoring for the target port to determine a state for the target port and a processing state for the digital I/O module; and in response to monitoring that the initial state changes, taking the changed state as the target state includes: in response to monitoring that the initial state changes, taking the changed state as the target state, and updating a processing state for the digital I/O module to a jitters-eliminating state.

In some embodiments, upon monitoring that the initial state changes, after the first monitoring period, determining that the jitters-eliminating processing for the signal received by the target port is completed includes: during the first monitoring period, in response to determining that a processing state for the digital I/O module monitored at each state monitoring is the jitters-eliminating state, determining that the jitters-eliminating processing for the signal received by the target port is completed, and updating a processing state for the digital I/O module to a filtering state; and in response to determining that, during the second monitoring period after determining the completion of the jitters-eliminating processing, the state for the target port monitored at each state monitoring is the target state, taking the target state as the state for the target port and storing the target state includes: during the second monitoring period, in response to determining that a processing state for the digital I/O module monitored at each state monitoring is the filtering state, and a state for the target port monitored at each state monitoring is the target state, taking the target state as the state for the target port and storing the target state.

In some embodiments, during the first monitoring period, in response to determining that a processing state for the digital I/O module monitored at each state monitoring is the jitters-eliminating state, determining that the jitters-eliminating processing for the signal received by the target port is completed, and updating the processing state for the digital I/O module to the filtering state includes: during the first monitoring period, in response to monitoring that the processing state for the digital I/O module is not the jitters-eliminating state at at least one state monitoring, updating the processing state for the digital I/O module to an initial state and monitoring a state for the target port again.

In some embodiments, the method further includes: during the second monitoring period, in response to monitoring that a state for the target port is not the target state at at least one state monitoring, taking the initial state as a state for the target port and storing the initial state.

In some embodiments, in response to determining that, during the second monitoring period after determining the completion of the jitters-eliminating processing, the state for the target port monitored at each state monitoring is the target state, taking the target state as the state for the target port and storing the target state includes: for each state monitoring for the target port during the second monitoring period, in response to monitoring that the state for the target port at the state monitoring is the target state, updating a time count for a specified counter; and in response to determining that a time count for the specified counter is greater than a time count corresponding to the second monitoring period, taking the target state as the state for the target port and storing the target state.

In some embodiments, the method further includes: if the time count corresponding to the designated counter exceeds the time count corresponding to the second monitoring period, or if the state corresponding to the target port is monitored at least once during the second monitoring period as not being the target state, then updating the time count corresponding to the designated counter to the initial time count.

In a second aspect, the present disclosure provides an apparatus for data acquisition including: a first determining module, configured to determine an initial state for a target port and perform state monitoring for the target port; a monitoring module, configured to, in response to monitoring that the initial state changes, take the changed state as a target state; a second determining module, configured to, upon monitoring that the initial state changes, after a first monitoring period, determine that a jitters-eliminating processing for a signal received by the target port is completed; a third determining module, configured to, during a second monitoring period after determining completion of the jitters-eliminating processing, determine whether a state for the target port monitored at each state monitoring is the target state; and in response to determining that, during the second monitoring period after determining completion of the jitters-eliminating processing, the state for the target port monitored at each state monitoring is the target state, take the target state as a state for the target port and store the target state; and an acquiring module, configured to perform data acquisition according to the stored state corresponding to the target port.

In a third aspect, the present disclosure provides a computer readable storage medium, where the storage medium stores a computer program, and when the computer program executed by a processor, the method for data acquisition described above is implemented.

In a fourth aspect, the present disclosure provides an electronic device including a memory, a processor and a computer program stored on the memory and runnable on the processor, where when the computer program is executed by the processor, the method for data acquisition described above is implemented.

At least one of the above technical solutions adopted in the present disclosure can achieve the following beneficial effect: in the method for data acquisition provided in the present disclosure, the digital I/O module determines an initial state for the target port and performs state monitoring; if the initial state is monitored to change, takes the changed state as the target state; upon monitoring the change of the initial state, after a first monitoring period, determines the completion of the jitters-eliminating for the signal received by the target port; and during a second monitoring period, determines whether a state for the target port monitored each time is the target state; if yes, takes the target state as a state for the target port and storing the target state; and performs data acquisition according to the stored state corresponding to the target port.

From the above method, it can be seen that in the embodiments, the target port is monitored, and after the jitters-eliminating process, when the target port maintains the target state every time the target port is monitored during the second monitoring period, the target state is considered to be the filtered state, and the target state can be stored to determine the acquired data. Compared to the method that requires a specified amount of data to be acquired before filtering, in the embodiments of the present disclosure, the filtering process can be performed for each data acquired, and since the time interval of state monitoring is usually small, and the time of each state monitoring is usually about 1 ms in practical application, the time used for each filtering process is much less than the average time of collecting the specified number of data and then calculating and then filtering according to the calculation results, and the filtering process in the present disclosure does not affect a processing for other subsequent processes. The filtering efficiency is greatly improved, which further improves the data acquisition efficiency and speeds up the response time of the control system.

BRIEF DESCRIPTION OF THE DRAWINGS

The accompanying drawings illustrated herein are used to provide further understanding of the present disclosure and form a part of the present disclosure. The exemplary embodiments and descriptions of the present disclosure are used to explain the present disclosure, and do not constitute limitation of the present disclosure. In the accompanying drawings.

DETAILED DESCRIPTION OF THE EMBODIMENTS

In order to make the purposes, technical solutions and advantages of the present disclosure clearer, the technical solutions of the present disclosure will be clearly and completely described below in conjunction with specific embodiments and corresponding drawings of the present disclosure. The described embodiments are only a part rather than all of the embodiments of the present disclosure. Other embodiments achieved by those of ordinary skill in the art based on the embodiments in the present disclosure without paying creative work shall all fall within the scope of protection of the present disclosure.

The technical solutions provided by the embodiments of the present disclosure are described in detail below in conjunction with the accompanying drawings.

Figure 1:
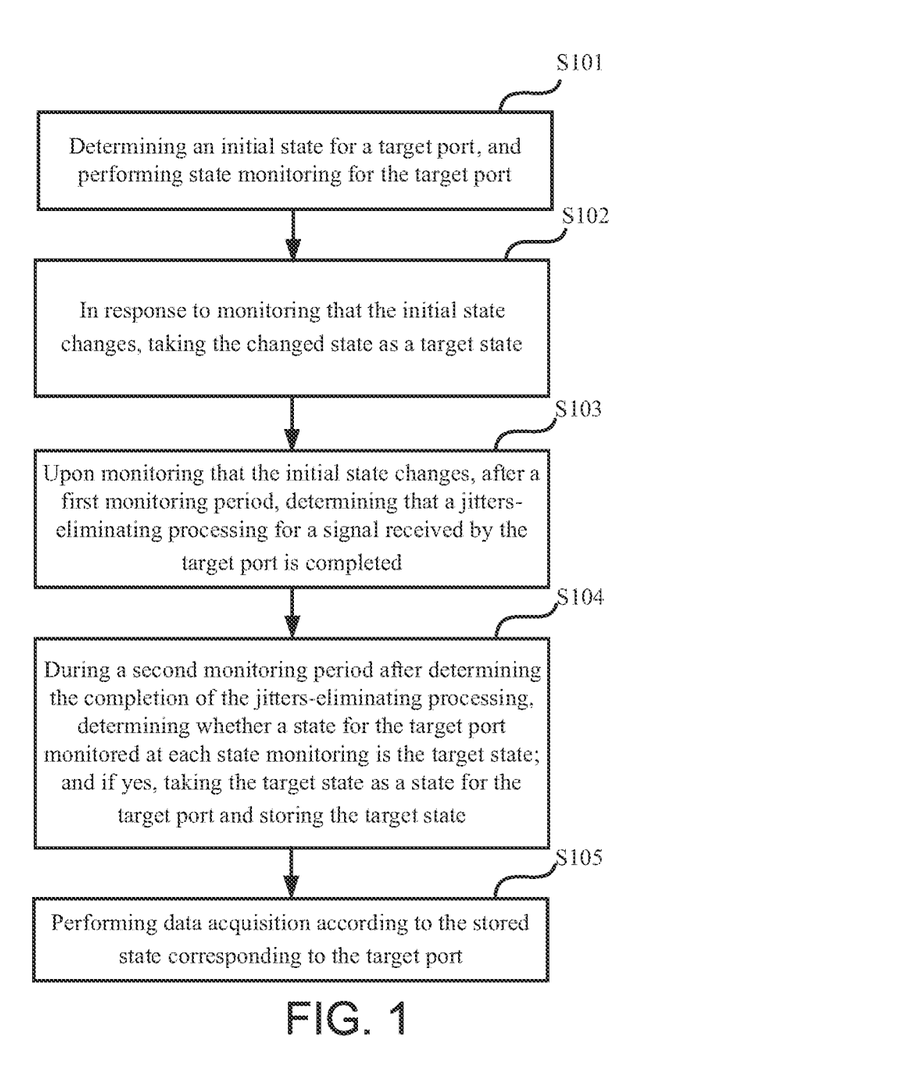
FIG. 1 is a schematic flowchart of a method for data acquisition provided in the present disclosure.

FIG. 1 is a schematic flowchart of a method for data acquisition provided in the present disclosure, including the following steps:

S101: an initial state for a target port is determined and a state of the target port is monitored.

In industrial control scenario (such as building automation, intelligent transportation, water treatment, energy management, environmental monitoring, and factory automation) as well as non-industrial control scenario, a control system needs to receive data acquired from the environment through a digital I/O module and then perform control operations in response to the received data. For example, the main equipment on site monitors feedback of a valve, a status of a movement equipment, a security signal, etc. A DI (Digital Input) signal reflects the opening and closing of on-site valves, the operation status of a movement equipment, whether there is a security alarm, etc. Therefore, it is necessary to receive these digital signals through a digital I/O module and upload these digital signals to the control system.

However, due to the influence of the data acquisition environment, internal circuit and components of the digital I/O module, the digital I/O module usually generates random interference and noise, which can cause errors in the acquired data. Therefore, in order to eliminate or alleviate the errors and improve accuracy of the acquired data, the acquired data needs to be filtered.

Based on this, the present disclosure provides a method for data acquisition, where the initial state for the target port needs to be determined. In practical applications, there are multiple input and output ports on the digital I/O module, and for one of the input ports, the input port can be determined as the target port, which generally corresponds to two states. For each input port, when data is input to the port, the port can receive a high level signal, and the state of the port usually corresponds to "1", and if there is no data input to the port or no low level signal is received, the state can remain as "0". For each output port, when there is data output from the port, the port can receive a high level signal and the state of the port corresponds to "1", and if no data is input to the port, the state of the port can remain as "0".

In practice, the initial state of the target port can be an initial I/O value of the target port, which may correspond to a state when the digital I/O module does not acquire data or is not turned on, and the initial state of the target port can also be a state corresponding to the last data acquisition. Therefore, in the present disclosure, the initial state for the target port can be "0" or "1".

In addition, in the present disclosure, the execution subject for the method for data acquisition can refer to a digital I/O module, which has a central processing unit (CPU) for executing a pre-written filtering algorithm for filtering, and the digital I/O module can determine the acquired data according to the state corresponding to each input port, and output the acquired data through each output port. Of course, in addition to the digital I/O module, the execution subject can also be other devices, such as a Single-Chip Microcomputer, that can collect and process data through corresponding ports which is not limited in the present disclosure.

After determining the state for the target port, the digital I/O module can set the time for each execution of a filtering algorithm through a pre-set monitoring timer, and when the filtering algorithm is executed, the digital I/O module will monitor the state of the target port according to the pre-set time interval corresponding to the monitoring timer, to monitor the state for the target port.

In the present disclosure, the execution process of the filtering algorithm can be divided into different stages, including a flip-flop monitoring stage, a jitters-eliminating stage, and a filtering stage. Different processing states of the digital I/O module can be set for different stages, where the flip-flop monitoring stage corresponds to an initial state of the digital I/O module, the jitters-eliminating stage corresponds to a jitters-eliminating state of the digital I/O module, and the filtering stage corresponds to a filtering state of the digital I/O module.

In practical applications, when some mechanical contacts are opened or closed, due to an elasticity of the mechanical contacts, a key switch is not immediately and steadily turned on when the key switch is closed, and the key switch is not immediately turned off when the key switch is opened. As a result, there is a series of jitters at the moment of closing and opening, which brings certain errors, and the jitters-eliminating stage can be used to eliminate the errors caused by these jitters.

Therefore, when the digital I/O module executes the filtering algorithm under the control of the monitoring timer, the digital I/O module can monitor the corresponding state of the target port and the corresponding processing state of the digital I/O module. In order to ensure timely filtering the signals received from the target port, the count of the monitoring timer can be set to 1 ms, i.e., the filtering algorithm is executed every 1 ms to monitor the state for the target port and the processing state for the digital I/O module. Of course, the monitoring timer can also be set to other counts such as 2 ms, 3 ms, 4 ms, etc. according to the actual situation, which is not limited in the present disclosure.

S102: when a change from the initial state is monitored, the changed state is taken as a target state.

When monitoring the corresponding state of the target port, the digital I/O module can determine whether the initial state of the target port changes during each state monitoring, and if the initial state changes, the changed state can be taken as the target state. Taking the initial state of the target port as "0" as an example, when the initial state changes (i.e., from "0" to "1"), the target port can be considered as receiving a signal input of data at this time, and the state of "1" of the target port can be taken as the target state.

In addition, when monitoring the corresponding state of the target port, the digital I/O module can also determine the processing state of the digital I/O module, and when the initial state of the target port changes, the processing state of the digital I/O module can be updated to the jitters-eliminating state, and meanwhile the filtering algorithm enters the execution process of the jitters-eliminating stage.

It should be noted that there are two initial states in the present disclosure, for example, the initial state for the target port and the initial state for the digital I/O module, but these two initial states are essentially different. The initial state for the target port can be understood as the state of the target port when the digital I/O module is started, and the initial state for the target port is "0" or "1". The initial state for the digital I/O module corresponds to the processing stage of the filtering algorithm, and the processing stage corresponding to the initial state for the digital I/O module is the stage of detecting whether the state of the target port is flipped.

S103: upon monitoring that the initial state changes, after a first monitoring period, it is determined that the jitters-eliminating processing for a signal received by the target port is completed.

When the filtering algorithm of the digital I/O module enters the execution process of the jitters-eliminating stage, it can be considered that the digital I/O module performs the jitters-eliminating process for the signal received by the target port. Usually, when the state of the target port flips, errors due to jitters usually last within 10 ms, that is, state change of the target port during this 10 ms may be due to jitters. Therefore, the 10 ms can be set as the first monitoring period, and jitters-eliminating processing is performed for the signal received by the target port within the first monitoring period. The jitters-eliminating processing may include: allowing the received signal to jitter naturally such that the jitter amplitude gradually attenuates until the signal becomes stable. After the first monitoring period elapses, it can be determined that the jitters-eliminating processing for the signal received by the target port is completed. Then, the corresponding processing state of the digital I/O module is updated to the filtering state, and proceed to the next filtering process.

The digital I/O module can also determine, according to the corresponding processing state of the digital I/O module, whether the target state is the state in which the jitters-eliminating processing is completed. When the corresponding processing states of the digital I/O module during the first monitoring period are jitters-eliminating state, it can be considered that the jitters-eliminating processing for the signal received by the target port is completed.

Of course, the above first monitoring period can also be set to 11 ms, 12 ms, 13 ms, . . . according to the actual situation, which is not limited in the present disclosure.

Further, during this process, the jitters-eliminating counter can be used to count, and each time the processing state for the digital I/O module is monitored, if the corresponding processing state of the digital I/O module is jitters-eliminating state, the count of the jitters-eliminating counter is increased by 1 ms, and when the count of the jitters-eliminating counter exceeds the count corresponding to the first monitoring period (10 ms), the jitters-eliminating counter returns to an initial count (0 ms), and then the processing state for the digital I/O module is updated to the filtering state. If the processing state for the digital I/O module at one state monitoring is not the jitters-eliminating state, the jitters-eliminating counter is cleared to 0 and the processing state for the digital I/O module returns to the initial processing state.

S104: during a second monitoring period after determining the completion of the jitters-eliminating processing, it is determined whether a state for the target port monitored at each state monitoring is the target state, and if yes, the target state is taken as a state for the target port and stored.

After entering the filtering state, the process of jitters-eliminating processing can be considered completed, and then further filtering processing can be executed. During the second monitoring period after determining the completion of jitters-eliminating processing, if the processing state for the digital I/O module monitored at each state monitoring is filtering state and the state for the target port is the target state (i.e., the state for the target port monitored at each state monitoring is "1"), it is considered that the state of the target port after jitters-eliminating is not caused by the fluctuation error generated by the interference, and in this case, the target state can be taken as the state corresponding to the target port and stored.

If the state corresponding to the target port is not the target state at one monitoring in the second monitoring period, or the processing state corresponding to the digital I/O module is not the filtering state, it means that the state of the target port is caused by the fluctuation error generated by the interference, or the previous jitters-eliminating processing is not successful and the state of the target port is caused by the error generated by the jitters, and in this case, the initial state corresponding to the target port can be stored.

In this process, a specified counter can be used to count. When the filtering algorithm is executed each time, if the processing state corresponding to the digital I/O module monitored is the filtering state, and a state corresponding to the target port monitored is the target state (a state of the target port for each monitoring is "1"), then the count of the filtering counter is increased by 1 ms, until the count of the filtering counter exceeds the count corresponding to the second monitoring period, then the filtering counter is cleared to 0, and the target state is determined as the state corresponding to the target port and stored. The second monitoring period can be set according to the actual situation, such as 10 ms, 11 ms, 12 ms, 13 ms . . . , which is not limited in the present disclosure.

If in the second monitoring period, when the filtering algorithm is executed, it is monitored that the processing state for the digital I/O module is not the filtering state, or the processing state for the digital I/O module is the filtering state, but the state for the target port is not the target state (the state of the target port jumps back from "1" to "0"), the filtering counter can be cleared to 0, and the initial state can be stored as the state corresponding to the target port. For ease of understanding, the present disclosure provides a schematic diagram of the filtering process, as shown in FIG. 2.

Figure 2:
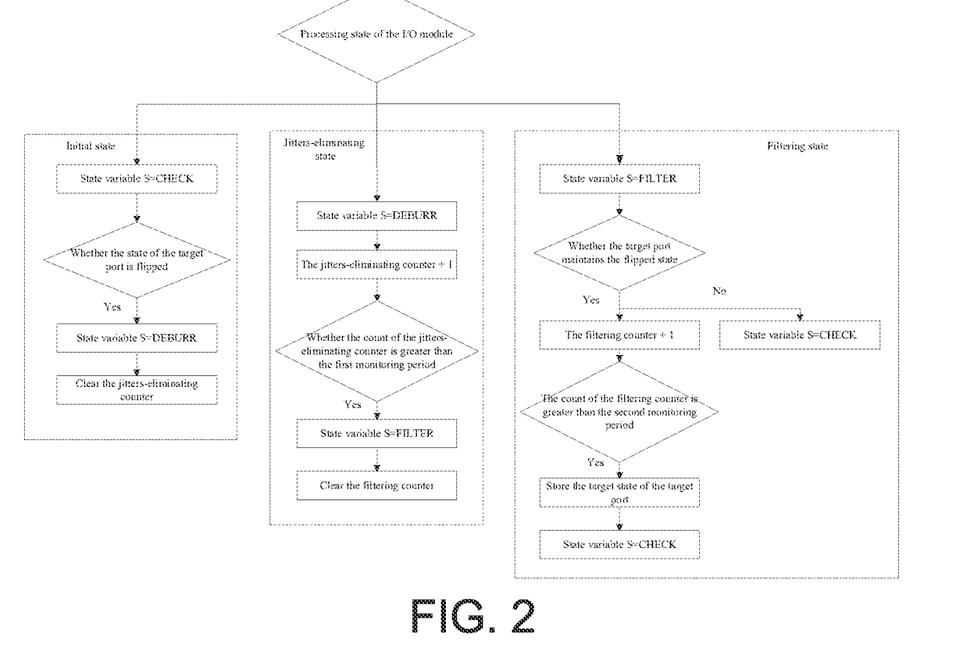
FIG. 2 is a schematic diagram of a filtering process provided in the present disclosure.

FIG. 2 is a schematic diagram of a filtering process provided in the present disclosure.

Different processing states of the digital I/O module correspond to different state variables S of a state machine. When S-CHECK, it corresponds to the initial state of the digital I/O module; when S=DEBURR, it corresponds to the jitters-eliminating state; and when S=FILTER, it corresponds to the filtering state. When the processing state of the digital I/O module is the initial state (S-CHECK), the digital I/O module can monitor whether the state of the target port is flipped (i.e., flipped from the initial state of "0" to "1"), and if the state of the target port is monitored to be flipped, the corresponding processing state of the digital I/O module can be updated to the jitters-eliminating state, S=DEBURR, and the jitters-eliminating counter can be cleared to 0.

When the filtering algorithm is executed at the next time (i.e. the next 1 ms), if S=DEBURR at this time, i.e. the jitters-eliminating state is maintained, the jitters-eliminating counter count increases by 1 ms, the above operations are repeated until the count of the jitters-eliminating counter is greater than the count corresponding to the first monitoring period. The jitters-eliminating processing is completed, and then the processing state corresponding to the digital I/O module is updated to the filtering state, S=FILTER, and the filtering counter is cleared to 0.

When the filtering algorithm is executed at the next state monitoring after the jitters-eliminating processing is completed, if S=FILTER at this time, that is, the filtering state is maintained, then it is further monitored whether the target port maintains the flipped state (that is, whether the state of the target port remains "1"). If not (that is, jump back to "0"), the processing state of the digital I/O module is updated to the initial state, at this time S=CHECK; if yes, the count of the filtering counter is increased by 1 ms until the count of the filtering counter exceeds the count corresponding to the second monitoring period, and when the count of the filtering counter exceeds the count corresponding to the second monitoring period, if the flipped state is still maintained, the target state of the target port is stored and the state variable is restored to S-CHECK for the filtering process for a next input signal.

In addition, the digital I/O module may also not take the initial state as the state of the target port upon monitoring that the state of the target port is not the target state during the second monitoring period, but accumulate the different monitored states of the target port. When the number of times that the state of the target port is monitored as the target state during the second monitoring period reaches a pre-set threshold, the target state is taken as the corresponding state of the target port and stored. Or when the number of times that the state of the target port is monitored to be not the target state within the second monitoring period reaches a pre-set threshold, the initial state is taken as the state corresponding to the target port and stored. Where a pre-set threshold can be set according to the actual situation, which is not limited in the present disclosure.

In addition, in the present disclosure, the first monitoring period and the second monitoring period can further be combined. For example, the first monitoring period is 10 ms, and the second monitoring period is also 10 ms, and then the combined pre-set period is 20 ms. Thus, upon monitoring that the initial state of the target port changes, the monitoring timer starts counting, and after 10 ms, it is determined that the jitters-eliminating process is completed. And within 10 ms-20 ms, filtering processing is performed. If in this period, the corresponding states of the target port are all the target state (that is, all "1") at each state monitoring, the target state can be stored as the state corresponding to the target port, and if at one state monitoring, the state corresponding to the target port is not the target state, the initial state is taken as the state corresponding to the target port and stored.

During the second monitoring period, the digital I/O module can use the corresponding counter to record the count of the target states corresponding to the target port monitored at each state monitoring. When the state corresponding to the target port is monitored as the target state at each state monitoring, then the count of the specified counter is increased.

It should be noted that in the embodiments, the count of each increment of the specified counter may be set to the same as the count of the monitoring timer, i.e., at each state monitoring, if the state for the target port is monitored as the target state, the count of the specified counter is increased by 1 ms. In this way, each time the count of the specified counter is increased by 1 ms, which indicates that the number of times that the state for the target port is monitored as the target state is increased by 1.

When the state for the target port is monitored to change to the target state, the digital I/O module can perform the jitters-eliminating process in the next first monitoring period (0 ms-10 ms). And in the next second monitoring period (10 ms-20 ms), the state for the target port is monitored according to the time interval of 1 ms. If the state for the target port monitored at each state monitoring is the target state, it means that the filtering is completed and the target state corresponding to the target port is the state without interference. At this time, the state corresponding to the target port can be updated to the target state and the target state can be stored.

In the second monitoring period (10 ms-20 ms), if monitoring that the state corresponding to the target port is not the target state (i.e., the state of the target port jumps back from "1" to "0") at at least one state monitoring, it means that the target state of the target port is the state generated after being interfered, then the state corresponding to the target port can be updated to the initial state and the initial state can be stored. At this time, the monitoring timer is updated to the initial value (0 ms) and the initial state for the target port is monitored again according to the pre-set time interval.

S105: data acquisition is performed based on the stored state corresponding to the target port.

According to the above-mentioned method for determining the corresponding state of the target port, the digital I/O module can determine and store the final state corresponding to each input port in the digital I/O module, and then according to the stored state corresponding to each input port, determine the acquired data, and input the acquired data to the next module through the output port. For example, the digital I/O module may determine the acquired binary value based on the stored I/O state of each input port, and the binary value is the digital signal corresponding to the acquired data.

In the embodiments of the present disclosure, state monitoring is performed on the target port, and after the jitters-eliminating process, when the target port maintains the target state at each state monitoring during the second monitoring period, the target state is considered to be the filtered state, and the target state can be stored to determine the acquired data. Compared to the method that a specified amount of data needs to be acquired for filtering, in the embodiments of the present disclosure, the filtering process can be performed for each data acquired, and since the time interval of state monitoring is usually short, and the time interval of each state monitoring is usually about 1 ms in practical application, the time used for each filtering process is much less than the average time of collecting the specified number of data and then calculating and then filtering according to the calculation results, and the filtering process in the present disclosure does not affect a processing for other subsequent processes. The filtering efficiency is greatly improved, which further improves the data acquisition efficiency and speeds up the response time of the control system.

Figure 3:
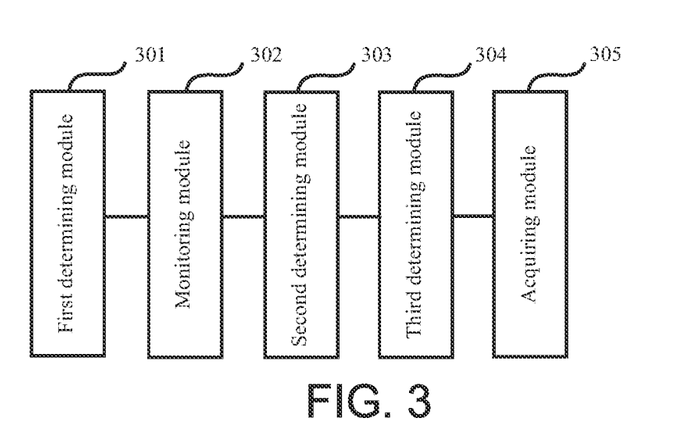
FIG. 3 is a schematic diagram of an apparatus for data acquisition provided in the present disclosure.

FIG. 3 is a schematic diagram of an apparatus for data acquisition provided in the present disclosure, including:

a first determinating module 301 configured to determine an initial state for a target port and perform state monitoring a state of the target port a monitoring module 302 configured to, in response to monitoring that the initial state changes, take the changed state as a target state;

a second determinating module 303 configured to, upon monitoring that the initial state changes, after a first monitoring period, determine that a jitters-eliminating processing for a signal received by the target port is completed;

a third determinating module 304 configured to, during a second monitoring period after determining completion of the jitters-eliminating processing, determine whether a state for the target port monitored at each state monitoring is the target state; and in response to determining that, during a second monitoring period after determining completion of the jitters-eliminating processing, a state for the target port monitored at each state monitoring is the target state, take the target state as a state for the target port and store the target state;

an acquiring module 305, configured to perform data acquisition according to the stored state corresponding to the target port.

In some embodiments, the first determinating module 301 is configured to perform state monitoring for the target port, to determine a state for the target port and determine a processing state for the digital I/O module;

The monitoring module 302 is configured to in response to monitoring that the initial state changes, take the changed state as a target state, and update a processing state for the digital I/O module to a jitters-eliminating state.

In some embodiments, the second determinating module 303 is configured to, during the first monitoring period, in response to determining that a processing state for the digital I/O module monitored at each state monitoring is the jitters-eliminating state, determine that the jitters-eliminating processing for a signal received by the target port is completed, and update a processing state for the digital I/O module to a filtering state; and the third determinating module 304 is configured to, during the second monitoring period, in response to determining that a processing state for the digital I/O module monitored at each state monitoring is the filtering state, and a state for the target port monitored at each state monitoring is the target state, take the target state as a state for the target port and store the target state.

In some embodiments, the second determinating module 303 is configured to, during the first monitoring period, in response to monitoring that the processing state for the digital I/O module is not the jitters-eliminating state at at least one state monitoring, update a processing state for the digital I/O module to the initial state and monitor a state for the target port again.

In some embodiments, the third determinating module 304 is configured to, during the second monitoring period, in response to monitoring that a state for the target port is not the target state at at least one state monitoring, take the initial state as a state for the target port and store the initial state.

In some embodiments, the third determinating module 304 is configured to, for each state monitoring for the target port during the second monitoring period, in response to monitoring that a state for the target port at the state monitoring is the target state, update a time count for a specified counter; and     in response to determining that a time count for the specified counter is greater than a time count corresponding to the second monitoring period, take the target state as a state for the target port and store the target state.

In some embodiments, the third determinating module 304 is configured to, in response to determining that a time count for the specified counter is greater than a time count corresponding to the second monitoring period, or monitoring that the state for the target port is not the target state at at least one state monitoring during the second monitoring period, update a time count for the specified counter to an initial time count.

The present disclosure further provides a computer readable storage medium that stores a computer program, where the computer program may be configured to perform a method for data acquisition as provided in FIG. 1 above.

Figure 4:
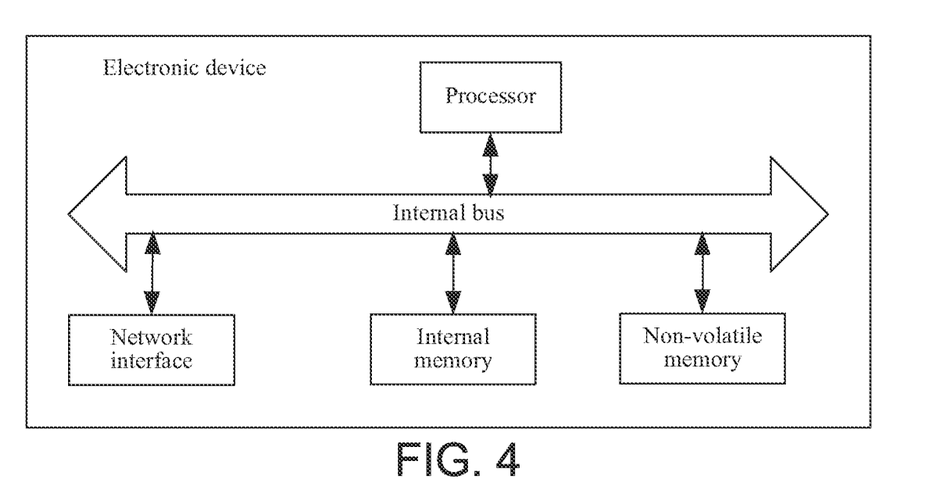
FIG. 4 is a schematic diagram of an electronic device corresponding to FIG. 1 provided in the present disclosure.

The present disclosure also provides a schematic structural diagram of an electronic device corresponding to FIG. 1 shown in FIG. 4. As shown in FIG. 4, at the hardware level, the electronic device includes a processor, an internal bus, a network interface, an internal memory, and a non-volatile memory, and may include hardware required for other operations. The processor reads the corresponding computer program from the non-volatile memory into the memory and then runs the computer program, to implement the method for data acquisition described in FIG. 1 above. Of course, in addition to the software implementation, the present disclosure does not exclude other implementation methods, such as logic devices or a combination of hardware and software, etc. That is, the execution body of the following processing process is not limited to individual logic units, but can also be hardware or logic devices.

In the 1990s, it was clear that improvements to a technology could be distinguished between hardware improvements (e.g., improvements to circuit structures such as diodes, transistors, switches, etc.) and software improvements (improvements to a method flow). However, with the development of technology, currently, the improvements of many method flows can be regarded as the direct improvements of the hardware circuit structures. Designers almost always get the corresponding hardware circuit structure by programming the improved method flow into the hardware circuit. Therefore, it cannot be said that a method flow improvement cannot be implemented with a hardware physical module. For example, a Programmable Logic Device (PLD) (e.g., Field Programmable Gate Array (FPGA)) is one such integrated circuit whose logic function is determined by user programming of the device. A digital system is "integrated" on a PLD by the designer's own programming, without the need for a chip manufacturer to design and manufacture a dedicated integrated circuit chip. Moreover, nowadays, instead of making IC chips manually, this programming is mostly implemented by "logic compiler" software, which is similar to the software compiler used for program development and writing, and the original code has to be written in a specific programming language before it is compiled. This is called Hardware Description Language (HDL), and there is not only one HDL, but many kinds, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, the most commonly used is Very-High-Speed Integrated Circuit Hardware Description Language (VHDL) and Verilog. It should also be clear to those skilled in the art that a hardware circuit implementing the logical method flow can be easily obtained by simply programming the method flow with a little logic in one of the above hardware description languages and programming the method flow into the integrated circuit.

The controller can be implemented in any suitable manner, for example, the controller can take the form of, for example, a microprocessor or processor and a computer readable medium storing computer readable program code (e.g. software or firmware) executable by the (micro)processor, logic gates, switches, Application Specific Integrated Circuit (ASIC), programmable logic controllers and embedded microcontrollers. Examples of the controllers may include, but are not limited to, the following microcontrollers: ARC 625D, Atmel AT91SAM, Microchip PIC18F26K20, and Silicone Labs C8051F320, and memory controllers may also be implemented as part of the control logic of the memory. It is also known to those skilled in the art that, in addition to implementing the controller in a purely computer readable program code manner, it is entirely possible to make the controller perform the same function in the form of logic gates, switches, specialized integrated circuits, programmable logic controllers, embedded microcontrollers, etc. by logically programming the method steps. Thus such a controller can be considered as a hardware component, and the devices included therein for implementing various functions can also be considered as structures within the hardware component. Or even, the apparatus for implementing various functions can be considered as both a software module for implementing a method and a structure within a hardware component.

The systems, apparatuses, modules, or units elucidated in the above embodiments can be implemented specifically by a computer chip or entity, or by a product with certain functions. An exemplary implementation device is a computer. Specifically, the computer may be, for example, a personal computer, a laptop computer, a cellular phone, a camera phone, a smart phone, a personal digital assistant, a media player, a navigation device, an email device, a gaming console, a tablet computer, a wearable device, or a combination of any of these devices.

For the convenience of description, the above devices are divided into various units according to their functions and described respectively. It is, of course, possible to implement the functions of each unit in the same or multiple software and/or hardware when implementing the present disclosure.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

the present disclosure is described with reference to flowcharts and/or block diagrams of methods, devices (systems), and computer program products according to embodiments of the present disclosure. It is to be understood that each process and/or block in the flowchart and/or block diagram, and the combination of processes and/or blocks in the flowchart and/or block diagram, may be implemented by computer program instructions. These computer program instructions may be provided to a processor of a general-purpose computer, a specialized computer, an embedded processor, or other programmable data processing device to produce a machine such that instructions executed by the processor of the computer or other programmable data processing device produce a apparatus for implementing a function specified in one or more processes of the flowchart and/or one or more blocks of the block diagram.

These computer program instructions may also be stored in a computer-readable memory capable of directing the computer or other programmable data processing device to operate in a particular manner such that the instructions stored in the computer-readable memory produce an article of manufacture including an instruction apparatus that implements the function specified in one or more processes of the flowchart and/or one or more blocks of the block diagram.

These computer program instructions may also be loaded onto a computer or other programmable data processing device such that a series of operational steps are executed on the computer or other programmable device to produce computer-implemented processing such that the instructions executed on the computer or other programmable device provide the steps used to perform the functions specified in one or more processes of the flowchart and/or one or more blocks of the block diagram.

In an exemplary configuration, the computing device includes one or more processors (CPUs), input/output interfaces, network interfaces, and memory.

Memory may include at least one of non-permanent storage in computer readable media, random access memory (RAM) or nonvolatile memory, such as read only memory (ROM) or flash RAM. Memory is an example of a computer readable medium.

Computer readable media include permanent and non-permanent, removable and non-removable media that can be implemented by any method or technology to store information. Information may be computer readable instructions, data structures, modules of a program, or other data. Examples of storage media for computers include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read only memory (CDROM), digital versatile disc (DVD) or other optical storage, magnetic cartridge tape, magnetic tape magnetic disk storage, other magnetic storage device or any other non-transport medium that can be used to store information that can be accessed by a computing device. As defined herein, computer readable media does not include transitory computer readable media, such as modulated data signals and carriers.

It should also be noted that the term "include", "comprise" or any other variation thereof is intended to cover non-exclusive inclusion, such that a process, method, article, or device that includes a set of elements includes not only those elements, but also other elements that are not explicitly listed, or other elements that are inherent to such a process, method, commodity, or device. Without further limitation, the element defined by the statement "including a . . . " do not preclude the existence of additional identical elements in the process, method, article, or device that include the element.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may employ the form of a computer program product implemented on one or more computer-usable storage media (including, but not limited to, disk storage, CD-ROM, optical storage, etc.), where the one or more computer-usable storage media having computer-usable program code.

The present disclosure may be described in the general context of computer-executable instructions executed by a computer, such as a program module. Generally, a program module includes routines, programs, objects, components, data structures, and the like that perform a specific task or implement a specific abstract data type. the present disclosure may also be practiced in distributed computing environments where tasks are performed by remote processing devices that are connected via a communication network. In distributed computing environments, program modules may be located in local and remote computer storage medium, including storage devices.

The various embodiments in the present disclosure are described in a progressive manner, and the same or similar parts between the various embodiments may be referred to each other, and each embodiment focuses on the differences from other embodiments. In particular, for a system embodiment, since it is basically similar to the method embodiment, the description is relatively simple, and for related parts, please refer to the partial description of the method embodiment.

The invention claimed is:

1. A method for data acquisition, applied to a digital input or output (I/O) module, comprising:
   determining an initial state for a target port;
   performing state monitoring for the target port;
   in response to monitoring that the initial state changes, taking the changed state as a target state;
   upon monitoring that the initial state changes, after a first monitoring period, determining that a jitters-eliminating processing for a signal received by the target port is completed;
   during a second monitoring period after determining the completion of the jitters-eliminating processing, determining whether a state for the target port monitored at each state monitoring is the target state;
   in response to determining that, during the second monitoring period after determining the completion of the jitters-eliminating processing, the state for the target port monitored at each state monitoring is the target state, taking the target state as a state for the target port and storing the target state; and
   performing data acquisition according to the stored state corresponding to the target port;

wherein performing state monitoring for the target port comprises:

performing state monitoring for the target port to determine a state for the target port and a processing state for the digital I/O module; and in response to monitoring that the initial state changes, taking the changed state as the target state comprises:

in response to monitoring that the initial state changes, taking the changed state as the target state, and updating a processing state for the digital I/O module to a jitters-eliminating state;

wherein upon monitoring that the initial state changes, after the first monitoring period, determining that the jitters-eliminating processing for the signal received by the target port is completed comprises:

during the first monitoring period, in response to determining that a processing state for the digital I/O module monitored at each state monitoring is the jitters-eliminating state, determining that the jitters-eliminating processing for the signal received by the target port is completed, and updating a processing state for the digital I/O module to a filtering state; and in response to determining that, during the second monitoring period after determining the completion of the jitters-eliminating processing, the state for the target port monitored at each state monitoring is the target state, taking the target state as the state for the target port and storing the target state comprises:

during the second monitoring period, in response to determining that a processing state for the digital I/O module monitored at each state monitoring is the filtering state, and a state for the target port monitored at each state monitoring is the target state, taking the target state as the state for the target port and storing the target state.

2. The method according to claim 1, wherein during the first monitoring period, in response to determining that a processing state for the digital I/O module monitored at each state monitoring is the jitters-eliminating state, determining that the jitters-eliminating processing for the signal received by the target port is completed, and updating the processing state for the digital I/O module to the filtering state comprises:

during the first monitoring period, in response to monitoring that the processing state for the digital I/O module is not the jitters-eliminating state at at least one state monitoring, updating the processing state for the digital I/O module to an initial state and monitoring a state for the target port again.

3. The method according to claim 1, wherein the method further comprises:

during the second monitoring period, in response to monitoring that a state for the target port is not the target state at at least one state monitoring, taking the initial state as a state for the target port and storing the initial state.

4. The method according to claim 1, wherein in response to determining that, during the second monitoring period after determining the completion of the jitters-eliminating processing, the state for the target port monitored at each state monitoring is the target state, taking the target state as the state for the target port and storing the target state comprises:

for each state monitoring for the target port during the second monitoring period, in response to monitoring that the state for the target port at the state monitoring is the target state, updating a time count for a specified counter; and in response to determining that a time count for the specified counter is greater than a time count corresponding to the second monitoring period, taking the target state as the state for the target port and storing the target state.

5. The method according to claim 4, wherein the method further comprises:

in response to determining that the time count for the specified counter is greater than the time count corresponding to the second monitoring period, or monitoring that the state for the target port is not the target state at at least one state monitoring during the second monitoring period, updating a time count for the specified counter to an initial time count.

6. A computer readable storage medium, wherein the storage medium stores a computer program, and when the computer program executed by a processor, a method for data acquisition is implemented, comprising:

determining an initial state for a target port;

performing state monitoring for the target port:

in response to monitoring that the initial state changes, taking the changed state as a target state;

upon monitoring that the initial state changes, after a first monitoring period, determining that a jitters-eliminating processing for a signal received by the target port is completed;

during a second monitoring period after determining the completion of the jitters-eliminating processing, determining whether a state for the target port monitored at each state monitoring is the target state;

in response to determining that, during the second monitoring period after determining the completion of the jitters-eliminating processing, the state for the target port monitored at each state monitoring is the target state, taking the target state as a state for the target port and storing the target state; and performing data acquisition according to the stored state corresponding to the target port;

wherein performing state monitoring for the target port comprises:

performing state monitoring for the target port to determine a state for the target port and a processing state for the digital I/O module; and in response to monitoring that the initial state changes, taking the changed state as the target state comprises:

in response to monitoring that the initial state changes, taking the changed state as the target state, and updating a processing state for the digital I/O module to a jitters-eliminating state;

wherein upon monitoring that the initial state changes, after the first monitoring period, determining that the jitters-eliminating processing for the signal received by the target port is completed comprises:

during the first monitoring period, in response to determining that a processing state for the digital I/O module monitored at each state monitoring is the jitters-eliminating state, determining that the jitters-eliminating processing for the signal received by the target port is completed, and updating a processing state for the digital I/O module to a filtering state; and in response to determining that, during the second monitoring period after determining the completion of the jitters-eliminating processing, the state for the target port monitored at each state monitoring is the target state, taking the target state as the state for the target port and storing the target state comprises:
during the second monitoring period, in response to determining that a processing state for the digital I/O module monitored at each state monitoring is the filtering state, and a state for the target port monitored at each state monitoring is the target state, taking the target state as the state for the target port and storing the target state.

7. An electronic device comprising a memory, a processor and a computer program stored on the memory and runnable on the processor, wherein when the computer program is executed by the processor, the electronic device implements:
determining an initial state for a target port;
performing state monitoring for the target port;
in response to monitoring that the initial state changes, taking the changed state as a target state;
upon monitoring that the initial state changes, after a first monitoring period, determining that a jitters-eliminating processing for a signal received by the target port is completed;
during a second monitoring period after determining the completion of the jitters-eliminating processing, determining whether a state for the target port monitored at each state monitoring is the target state;
in response to determining that, during the second monitoring period after determining the completion of the jitters-eliminating processing, the state for the target port monitored at each state monitoring is the target state, taking the target state as a state for the target port and storing the target state; and
performing data acquisition according to the stored state corresponding to the target port;
wherein performing state monitoring for the target port comprises:
performing state monitoring for the target port to determine a state for the target port and a processing state for the digital I/O module; and
in response to monitoring that the initial state changes, taking the changed state as the target state comprises:
in response to monitoring that the initial state changes, taking the changed state as the target state, and updating a processing state for the digital I/O module to a jitters-eliminating state;
wherein upon monitoring that the initial state changes, after the first monitoring period, determining that the jitters-eliminating processing for the signal received by the target port is completed comprises:
during the first monitoring period, in response to determining that a processing state for the digital I/O module monitored at each state monitoring is the jitters-eliminating state, determining that the jitters-eliminating processing for the signal received by the target port is completed, and updating a processing state for the digital I/O module to a filtering state; and
in response to determining that, during the second monitoring period after determining the completion of the jitters-eliminating processing, the state for the target port monitored at each state monitoring is the target state, taking the target state as the state for the target port and storing the target state comprises:
during the second monitoring period, in response to determining that a processing state for the digital I/O module monitored at each state monitoring is the filtering state, and a state for the target port monitored at each state monitoring is the target state, taking the target state as the state for the target port and storing the target state.

8. The electronic device according to claim 7, wherein during the first monitoring period, in response to determining that a processing state for the digital I/O module monitored at each state monitoring is the jitters-eliminating state, determining that the jitters-eliminating processing for the signal received by the target port is completed, and updating the processing state for the digital I/O module to the filtering state comprises:
during the first monitoring period, in response to monitoring that the processing state for the digital I/O module is not the jitters-eliminating state at at least one state monitoring, updating the processing state for the digital I/O module to an initial state and monitoring a state for the target port again.

9. The electronic device according to claim 7, wherein the electronic device further implements:
during the second monitoring period, in response to monitoring that a state for the target port is not the target state at at least one state monitoring, taking the initial state as a state for the target port and storing the initial state.

10. The electronic device according to claim 7, wherein in response to determining that, during the second monitoring period after determining the completion of the jitters-eliminating processing, the state for the target port monitored at each state monitoring is the target state, taking the target state as the state for the target port and storing the target state comprises:
for each state monitoring for the target port during the second monitoring period, in response to monitoring that the state for the target port at the state monitoring is the target state, updating a time count for a specified counter; and
in response to determining that a time count for the specified counter is greater than a time count corresponding to the second monitoring period, taking the target state as the state for the target port and storing the target state.

11. The electronic device according to claim 10, wherein the electronic device further implements:
in response to determining that the time count for the specified counter is greater than the time count corresponding to the second monitoring period, or monitoring that the state for the target port is not the target state at at least one state monitoring during the second monitoring period, updating a time count for the specified counter to an initial time count.

* * * * *